United States Patent [19]

Collins

[11] Patent Number: 4,858,369
[45] Date of Patent: Aug. 22, 1989

[54] FISHING FLOAT

[76] Inventor: Burk Collins, P.O. Box 23, Collegville, Tex. 76034

[21] Appl. No.: 251,308

[22] Filed: Sep. 30, 1988

[51] Int. Cl.⁴ .................. A01K 93/00; A01K 91/00
[52] U.S. Cl. ................................ 43/43.1; 43/17.5; 43/43.11; 43/44.87; 441/6
[58] Field of Search .............. 43/43.1, 43.11, 44.87, 43/44.95, 17.5; 441/81, 84, 1, 6, 21, 23, 24, 25, 26

[56] References Cited

U.S. PATENT DOCUMENTS

| | | | |
|---|---|---|---|
| 669,144 | 3/1901 | Noyes | 441/24 |
| 2,678,511 | 5/1954 | Wright | 43/43.11 |
| 2,904,923 | 9/1959 | Conyers | 43/43.11 |
| 3,144,729 | 8/1964 | Jonassen | 43/43.11 |
| 3,149,435 | 9/1964 | Nordeen | 43/26.1 |
| 4,406,081 | 9/1983 | Garner | 43/43.11 |
| 4,501,564 | 2/1985 | Cairone | 43/17.5 |
| 4,607,449 | 8/1986 | Brache | 43/43.11 |
| 4,785,567 | 11/1988 | Consiglio | 43/17.5 |

Primary Examiner—Gene P. Crosby
Attorney, Agent, or Firm—Charles D. Gunter, Jr.

[57] ABSTRACT

A fishing float is shown for use in running a trotline. The fishing float includes a spherical body molded from a light weight plastic material which has a hollow interior and an exterior. A line-engaging downward projection extends from one point on the exterior of the body for receiving a trotline. A combination handle and line wrapping extension are located diametrically opposite the downward projection on the exterior of the body. A visibility enhancing material is incorporated into the plastic material of the body so that the float can be more easily seen at night.

6 Claims, 2 Drawing Sheets

FISHING FLOAT

BACKGROUND OF THE INVENTION

1. Field of the Invention

The present invention relates to fishing floats for supporting fishing line and specifically to a fishing float for use in supporting a trotline having a plurality of depending hooks.

2. Description of the Prior Art

A trotline is a strong fishing line suspended over or submerged in water which supports a plurality of short, baited lines hung from it at intervals. It is sometimes referred to as a trawl line in the fishing arts. Jugs or other flotation devices are customarily utilized to support the ends of the trotline so that the shorter baited lines and hooks are maintained at a desired depth within the body of water. Trotline fishing is usually conducted at night or in dusky light conditions and it is often difficult to see the jug or flotation device.

There exists a need for an improved fishing float for use in running a trotline which is easily visible at night.

Another need exists for such a fishing float which is contoured for optimum floating characteristics.

Another need exists for a fishing float having a convenient carrying handle and provision for wrapping fishing line thereon when the float is not in use.

Another need exists for a fishing float of the above type which is simple in design and economical to manufacture.

SUMMARY OF THE INVENTION

The fishing float of the invention includes a spherical body molded from a light weight plastic material, the spherical body having a hollow interior and an exterior. A line-engaging downward projection extends from one point on the exterior of the body for receiving a trotline. A combination handle and line wrapping extension is located opposite the line-engaging downward projection on the exterior of the body. The plastic material of the spherical body has incorporated therein a visibility enhancing material such as a dye or pigment having luminescent properties.

Additional objects, features and advantages will be apparent in the written description which follows.

DETAILED DESCRIPTION OF THE INVENTION

Figure 1:
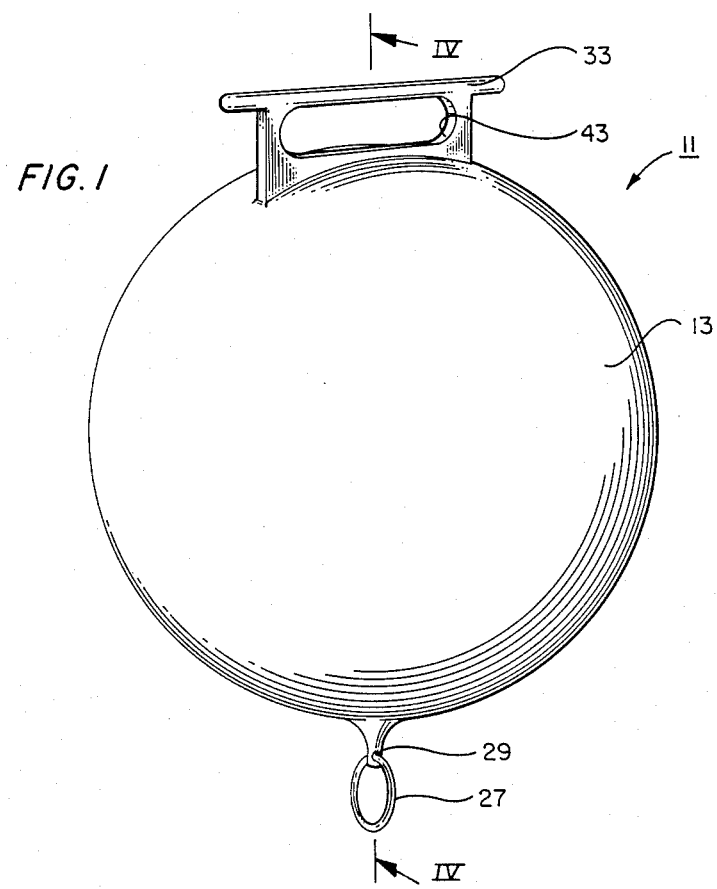
FIG. 1 is a front, perspective view of the fishing float of the invention.
Figure 2:
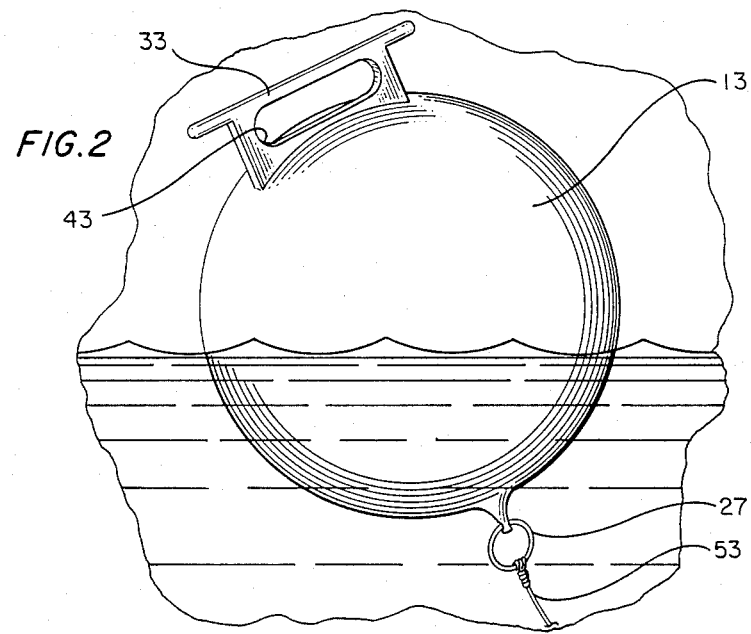
FIG. 2 is an isolated view of the fishing float of FIG. 1 with a fishing line received within the line engaging ring thereof.

FIG. 1 shows a fishing float of the invention designated generally as 11. The fishing float includes a spherical body 13 which is constructed from any convenient light weight material. Preferably, the spherical body 13 is injection molded from a light weight plastic material. Preferred materials include polyolefins such as polypropylene and polyethylene, vinyl plastics such as polyvinyl chloride and organic polycarbonates such as the commercial products made by reacting bisphenol A with carbonyl chloride.

In order to improve the visibility characteristics of the fishing float, the plastic material of the spherical body preferably has incorporated therein a visibility enhancing material. Such visibility enhancing materials are known in the art and include pigments or dyes having luminescent properties as well as fluorescent dyes or pigments. For instance, the plastic material could be provided as a polycarbonate having a fluorescent dye incorporated therein. Preferably, the visibility characteristics of the fishing float are improved by providing the spherical body of synthetic plastic with a luminescent pigment such as an inorganic zinc sulfide phosphor so that the spherical body is luminous Such luminescent additives are commercially available and are described, for instance, in U.S. Pat. No. 4,759,453, issued July 26, 1988, to James M. Paetzold. Preferably, the visibility enhancing material is incorporated directly into the plastic material of the body although the plastic material could be coated with a visibility enhancing material.

Figure 4:
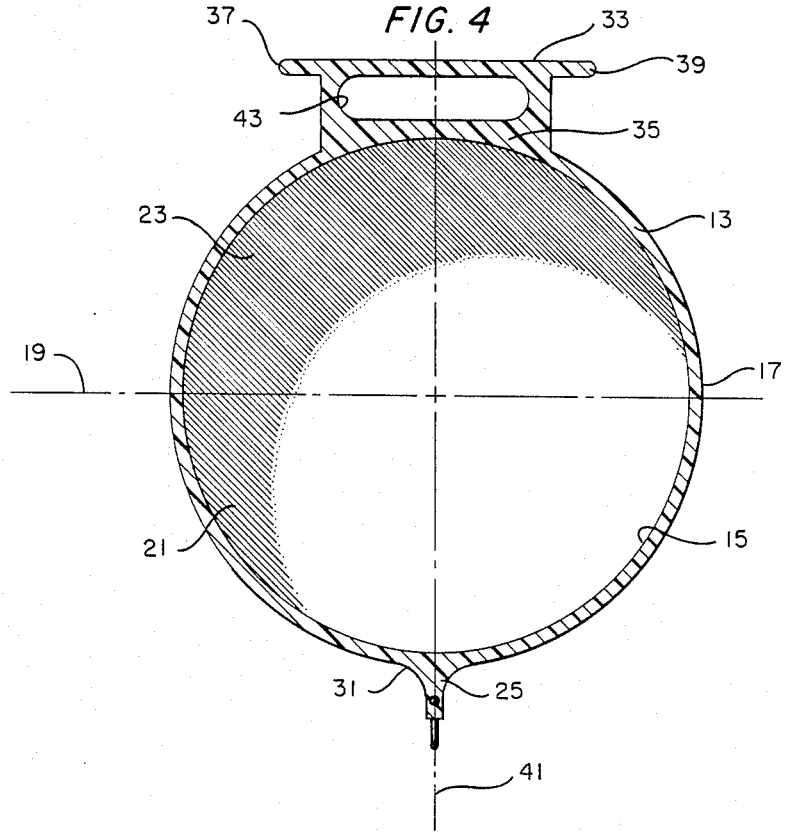
FIG. 4 is a cross-sectional view of the fishing float of FIG. 1 taken along lines IV—IV.

As shown in FIG. 4, the spherical body 13 has a hollow interior 15 and an exterior 17. The exterior 17 can be divided by an imaginary horizontal centerline 19 between a lower hemisphere 21 and an upper hemisphere 23. A line-engaging downward projection 25 extends from a point on the exterior 17 of the body for receiving a trotline. The point is approximately midway along the arcuate surface defined by the crosssection of the lower hemisphere 21 as viewed in FIG. 4. Preferably, the downward projection 25 is integrally molded as a part of the light weight plastic material of the body and includes a ring 27 (FIG. 1) received within a ring opening 29. As shown in FIG. 4, the downward projection 25 includes gently slopping sides 31 which flow into the smooth contour of the spherical body 13.

A combination handle and line wrapping extension 3 is located diametrically opposite the line-engaging downward projection 25 on the exterior of the body 13 in the upper hemisphere 23. The combination handle and line wrapping extension is integrally formed of the light weight plastic material in a T-shaped configuration. The T-shaped configuration includes a central, vertical portion 35 and oppositely extending, horizontal extents 37, 39. As best seen in FIG. 4, the downward projection 25 is located on a imaginary vertical axis 41 which generally bisects the central vertical portion 35. The central vertical portion 35 includes a hand opening 43 for receiving the fingers of a user's hand so that the fishing float can be conveniently transported. The oppositely extending horizontal extents 37, 39 form retaining nubs for retaining fishing line which is wound about the vertical portion 35 when the fishing float is not in use.

Figure 3:
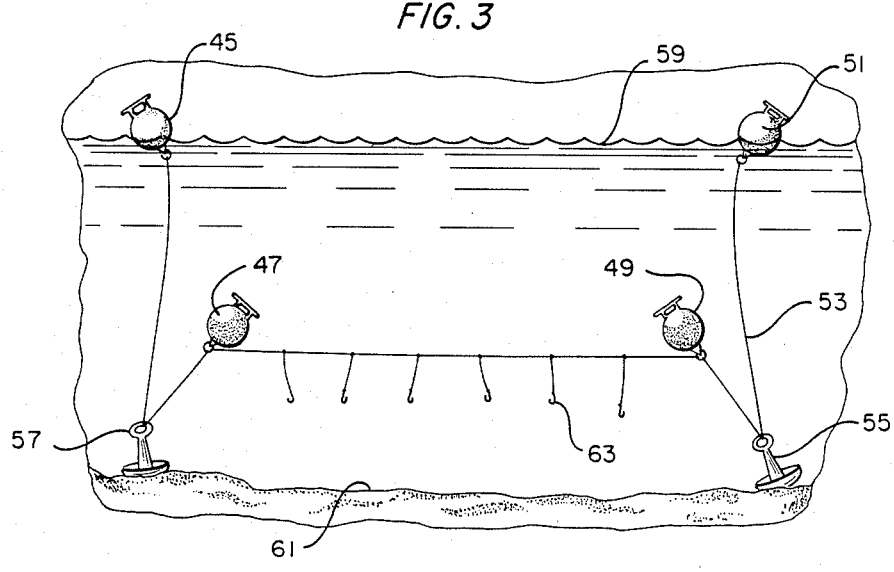
FIG. 3 is a schematic view of a trotline suspended within a body of water by a plurality of the fishing floats of the invention.

A plurality of fishing floats 45, 47, 49, 51 can be used to support a trotline 53, as shown in FIG. 3. In the preferred configuration, the trotline 53 runs between the line-engaging ring of float 51 through an anchor weight 55, through the line-engaging rings of floats 49, 47 and through the anchor weight 57 to the line-engaging ring of float 45. In this manner, the floats 47, 49 are suspended at an intermediate depth between the water surface 59 and the bottom 61 and allow a plurality of a baited hooks 63 to be suspended in horizontal fashion.

An invention has been provided with several advantages. Because the plastic material of the spherical body includes a visibility enhancing material, the float can be easily identified at night or in dusky lighting conditions The spherical body is evenly balanced by the downwardly extending line-engaging projection and the oppositely arranged combination handle and line wrapping extension. As a result, the flotation characteristics of the fishing float are improved. The handle provides a convenient means for transporting the float and also includes retaining nubs for retaining fishing line which is wound about the handle vertical portion when the float is not in use. The fishing float can be injection molded from a light weight plastic material and is simple in design and inexpensive to manufacture.

While the invention has been shown in only one of its forms, it is not thus limited but is susceptible to various changes and modifications without departing from the spirit thereof.

I claim:

1. A fishing float for use in running a trot line, the float comprising:
   a spherical body molded from a lightweight plastic material, said spherical body having a hollow interior and an exterior;
   a line-engaging downward projection extending from one point on the exterior of said body for receiving a trot line;
   a combination handle and line wrapping extension located opposite said line-engaging downward projection on the exterior of said body; and
   wherein the plastic material of said spherical body has incorporated therein a visibility enhancing material.

2. The fishing float of claim 1, wherein said spherical body can be divided by a horizontal centerline between a lower hemisphere including said line-engaging downward projection and an upper hemisphere, said combination handle and line wrapping extension being located in said upper hemisphere diametrically opposite said line engaging downward projection.

3. The fishing float of claim 2, wherein said combination handle and line wrapping extension is integrally formed of said lightweight plastic material in a T-shape with a central, vertical portion and oppositely extending, horizontal extents.

4. The fishing float of claim 3, wherein said central vertical portion of said combination handle and line wrapping extension has a hand opening and wherein said oppositely extending horizontal extents form retaining nubs for retaining fishing line which is wound about said vertical portion.

5. The fishing float of claim 4, wherein said plastic material used to form said spherical body has a luminescent pigment incorporated therein.

6. A fishing float for use in running a trot line, the float comprising:
   a spherical body molded from a lightweight plastic material, said spherical body having a hollow interior and an exterior, the exterior of said spherical body being divided by an imaginary horizontal centerline between a lower hemisphere and an upper hemisphere;
   an integrally molded, line-engaging downward projection extending from one point on the exterior of said body in said lower hemisphere;
   a ring mounted in said downward projection for receiving a trot line;
   a combination handle and line wrapping extension located diametrically opposite said line-engaging downward projection on the exterior of said body in said upper hemisphere, said combination handle and line wrapping extension being integrally formed of said lightweight plastic material in a T-shape with a central, vertical portion and oppositely extending, horizontal extents, whereby said downward projection is located on a vertical axis which generally bisects the central vertical portion, said central vertical portion including a hand opening and the oppositely extending, horizontal extents forming retaining nubs for retaining fishing line which is wound about said vertical portion; and
   wherein said plastic material used to form said spherical body has a luminescent pigment incorporated therein.

* * * * *